L. O. ROCKWOOD.
Cider-Mills.
No. 139,975.             Patented June 17, 1873.
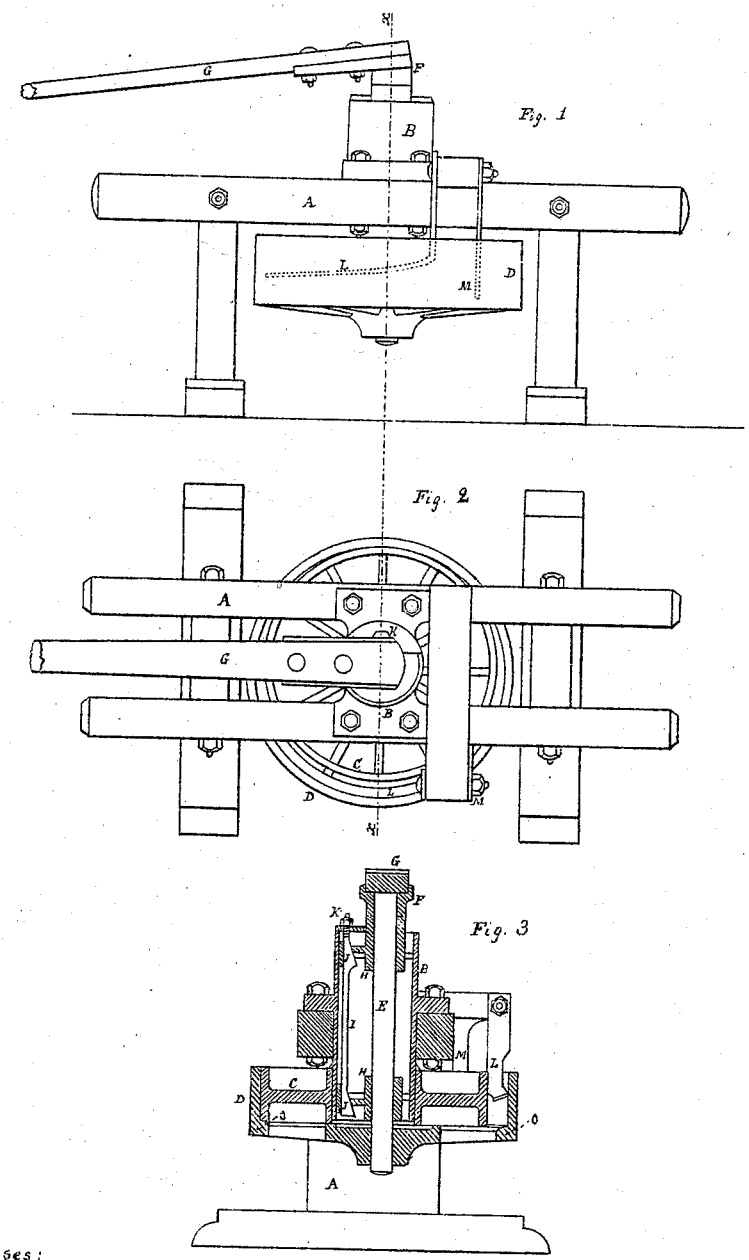
Witnesses:
Edward Rose
John Miller
Inventor:
Loring Otis Rockwood

UNITED STATES PATENT OFFICE.

LORING O. ROCKWOOD, OF OTTAWA, ILLINOIS.

IMPROVEMENT IN CIDER-MILLS.

Specification forming part of Letters Patent No. 139,975, dated June 17, 1873; application filed April 11, 1873.

*To all whom it may concern:*

Be it known that I, LORING OTIS ROCKWOOD, of Ottawa, in the county of Lasalle and State of Illinois, have invented certain Improvements in Cider-Mills, of which the following is a specification:

The first part of my invention consists in passing the shaft of one of the crushing-wheels through the hub of the other, for the purpose of reducing as much as possible the number of friction-surfaces, so that the parts will be held firmly and permanently in position, and not liable to displacement by wear.

The second part of my invention consists in a novel arrangement of sliding boxes, and a double wedge inside of a hollow axle, and the whole secured in position by a nut above, whereby the pressure of one wheel against the other can be regulated with great convenience; and the direction of this pressure in crushing the apples is in the line of the bearings upon which these two wheels respectively turn, thus causing no strain whatever on the frame. The third part of my invention consists in the use of an inclined feed-floor, so arranged in relation to the wheels as to cause the apples to feed in some distance above the lower edge of these wheels, thus giving the pomace room within the limits of the wheels to spread under the pressure; this feed-floor being inclined downward toward one of the wheels, between which and it an open space is left for the purpose of allowing pebbles and other hard substances that may chance to be mixed with the apples to drop through, and thus save the machine from the great strain which it would be subject to if such substances were allowed to pass.

Figure 1 is a side elevation of a machine embodying my invention. Fig. 2 is a plan of the same. Fig. 3 is a vertical tranverse section showing those parts of the machine which are at the right hand of the line $x\ x$, drawn across Figs. 1 and 2.

A is the frame onto which is bolted with four bolts, the hollow axle B. On this axle revolves the wheel C, simply by contact with the wheel D, which is keyed to the shaft E. This shaft E passes through the hub of the wheel C, and also through the hollow axle B, and has on top a cross-head, F, with a sweep, G, to which a horse is hitched. The shaft E, in passing through the hollow axle B, is held by two sliding boxes, H H, which slide sidewise in such a manner that by means of the double wedge I resting on two bolsters, J J, and drawn up by the nut K, the outside wheel D can be made to press more or less tightly against the inside wheel C. In the open space between the wheels C and D, in front of the machine, I adapt the inclined feed-board L, which is arranged so as to be in close contact with the outside wheel D, while a space is left between its lower and inner edge and the inner wheel C, this open space being intended to allow pebbles or other hard substances mixed up with the apples to drop through, so that they need not be crushed, at the risk of breaking the machine. The wheel D has at the bottom a flange, O, which operates as a moving floor to carry the small pieces of fruit that may drop down in the process of being crushed forward to the point of close contact of the pressing-surfaces, and also to carry the pomace that may fall after being pressed around to the place of exit where it is scraped off by the scraper M. A scraper, M, scrapes off both wheels as they turn around just ahead of the point where more apples are fed in.

To use this machine it must be well fastened to the floor or ground, and a ditch must be made under the center part to receive the vats into which the cider is collected as it runs through the wheel D.

What I claim as my invention, and desire to secure by Letters Patent, is—

1. Passing the shaft E of the wheel D through the hub of the wheel C, when both wheels revolve in the same direction, and are not concentric with each other, substantially as described.

2. The combination of the hollow axle B with the slide-boxes H H, bolsters J J, nut K, double wedge I, and shaft E, substantially as, and for the purpose described.

3. The inclined feed-floor L, constructed and applied substantially as and for the purpose described.

4. The flange O at the bottom of the wheel D, for the purpose described.

LORING OTIS ROCKWOOD.

Witnesses:
 EDWARD ROSE,
 JOHN MILLER.